Aug. 26, 1969 P. H. EMERSON 3,462,852

TELEVISION VIEWER-PARTICIPATION DEVICE

Filed Nov. 8, 1967 2 Sheets-Sheet 1

INVENTOR.
PAUL H. EMERSON
BY
Brown, Critchlow, Flick & Peckham
ATTORNEYS.

TELEVISION VIEWER-PARTICIPATION DEVICE

Filed Nov. 8, 1967 2 Sheets-Sheet 2

INVENTOR.
PAUL H. EMERSON
BY
Brown, Critchlow, Flick & Peckham
ATTORNEYS.

3,462,852

TELEVISION VIEWER-PARTICIPATION DEVICE

Paul H. Emerson, 1349 Briarcliff Road, Atlanta, Ga. 30306

Filed Nov. 8, 1967, Ser. No. 681,417
Int. Cl. G09b *1/00;* A63h *33/00*
U.S. Cl. 35—8 11 Claims

ABSTRACT OF THE DISCLOSURE

A vision-limiting shield has means for detachably connecting it to a television receiver, with the tubular front portion of the shield close to the television screen and surrounding the major area thereof. The shield also has side portions extending rearwardly from the tubular portion and adapted to straddle a viewer's head to restrict his lateral vision. Manually manipulatable simulated controls are carried by the shield for operation by the viewer in response to oral commands received from the television receiver.

It is among the objects of this invention to provide an inexpensive device which can easily be attached to a television receiver and which permits children looking at the televised picture through the device to participate in a realistic manner in the program being broadcast.

One of the best ways to gain and hold the attention of children whom it is desired to subject to television advertisements of products or to messages regarding health and safety and the like would be to have them participate in the televised program, but heretofore there has been no way of doing that when they are merely viewers and not in the television studio. However, now, in accordance with this invention a special television program can be broadcast, in which it is pretended that the viewer is operating a vehicle, such as a spacecraft, ship, submarine or the like, traveling through the area and meeting with the adventures depicted on the television screen. The viewer can be instructed orally from the television receiver how to manipulate simulated controls before him to cause his make-believe vehicle to perform as a real vehicle would if the television picture were real. To produce this illusion, a shield is attached to the receiver and is so shaped that the viewer, seeing the televised picture through it, feels cut off from his immediate surroundings and in charge of the imaginary vehicle formed in part by the shield itself. The simulated controls are carried by this shield.

The invention is illustrated in the accompanying drawings, in which.

Figures 1, 2:
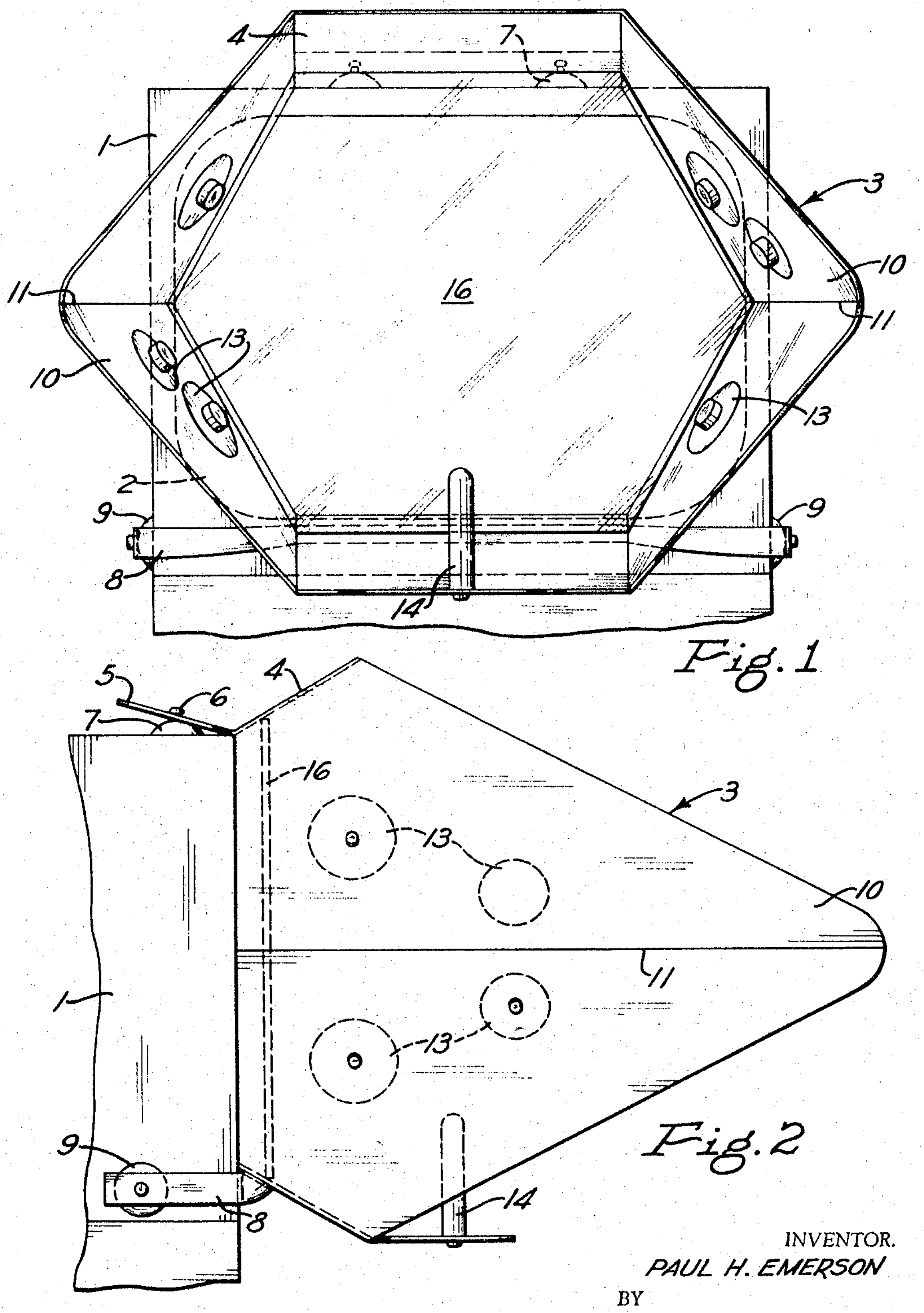
FIG. 1 is a rear view of my viewing device attached to a television receiver.
FIGS. 2 and 3 are side and plan views, respectively, of the device.
Figure 3:
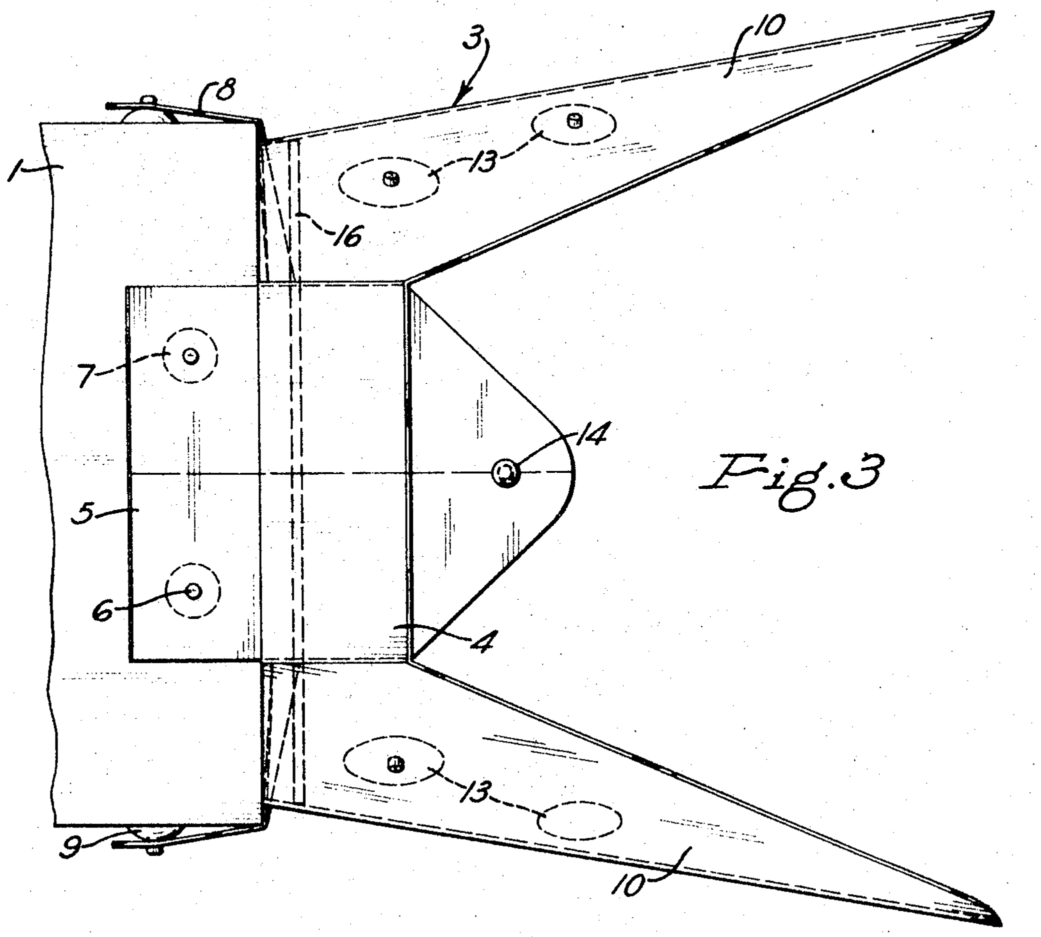

Referring to the drawings, a conventional television receiver 1 has the usual picture tube or screen 2 on which a picture appears when the receiver is operating. Detachably connected to the receiver is a shield 3 that has front and rear ends. This shield is made from stiff sheet material, such as heavy paperboard or a plastic, and has a tubular front portion 4, the size and shape of which is such that when placed close to or against the television screen it will surround the major area of it so that the televised picture can be seen through the shield. For attaching the shield to the receiver, the top of the inner end of the shield may be provided with an integral flap 5 that extends forward a short distance over the top of the receiver. Projecting through one or more holes in this flap are the stems 6 of suction cups 7 which can be pressed down onto the top of the receiver to hold the shield in operative position. If desired the lower part of the shield also can be anchored to the receiver by securing a strap 8 across the bottom of the shield at its front end, and attaching suction cups 9 to the ends of the strap for engagement with the opposite sides of the set.

The tubular portion 4 of the shield flares rearwardly from its front end and the shield has rearwardly diverging side portions 10 that extend back from the tubular portion far enough to straddle the head of a viewer looking at the televised picture through the shield. These side portions or "blinders" restrict the vision of the viewer laterally and also prevent him from looking past the sides of the receiver by preventing him from seeing what is beyond them. The top of the shield may extend back a little further than the bottom, if desired, to help prevent the viewer from seeing above the shield when he is looking straight ahead. Preferably, the side portions are tapered rearwardly as shown in FIG. 2 to reduce the bulk of the shield. Each of the side portions also has a central longitudinal fold line 11, along which it is bent to produce upper and lower flat areas that are inclined outwardly toward each other in order to stiffen the side portion against flexing laterally.

When a viewer, usually a child, sits with his head between the side portions of the shield and looks at the television screen ahead of him, he is cut off by the shield from his immediate surroundings and their distracting influence. This isolation makes the picture on the screen appear more realistic to him and as if the action were actually taking place in his presence in front of the shield. The illusion is even more pronounced if none, or only a very little, of the television cabinet itself can be seen through the shield. In other words, it is preferred that the relative sizes of the shield and screen be such that only the screen is seen.

Another feature of this invention is that simulated controls 13 are carried by the shield and are provided with movable elements that can be manipulated by the viewer in response to orders given him by a television announcer or by characters on the television screen. These controls are mounted on the inner surface of the shield, such as the inner faces of its tapered side portions. The controls may bear various labels, such as speed, altitude, time and direction. They also may include a steering device, such as a wheel or stick 14 plugged into a hole in the bottom of the shield behind its tubular front portion. Operating these controls as ordered from the receiver keeps the child busy and concentrating on the televised program, and thereby maintains his participation and interest.

Figure 4:
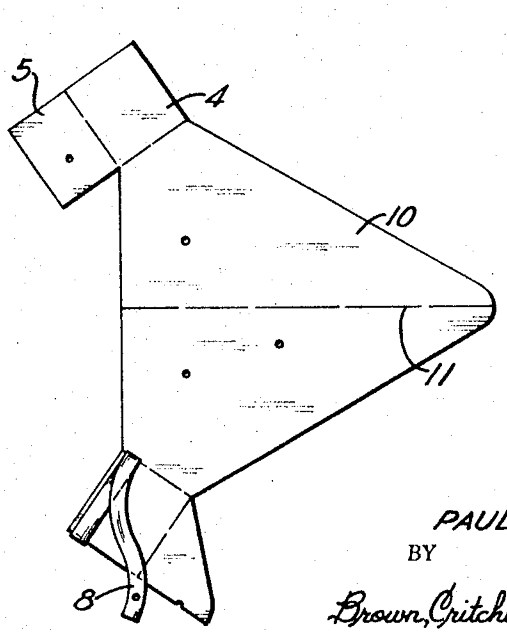
FIG. 4 is a reduced side view of the viewing device removed from the receiver and folded flat.

The realistic effect that this shield produces is promoted by inserting a glass or clear plastic "windshield" or window 16 in the shield near its front end. This window is pressed into the tubular portion of the shield far enough for it to be held by friction. The window makes the shield feel more like the cockpit of a spacecraft or the pilot house of a ship. Furthermore, any reflections of lights or nearby objects in the room are from the transparent window instead of from the television screen, and this also helps the illusion that the viewer is inside a vehicle and looking out at the action depicted by the picture on the television screen. Another advantage of the window is that it stiffens the shield and helps it to maintain its shape, especially when the shield is a foldable element as it generally is. It is designed to be folded flat along top and bottom fold lines for mailing and storage as shown in FIG. 4. To facilitate this, the controls or their projecting parts may be detachably connected to the shield in any suitable manner, such as by pressure sensitive adhesive or by providing the backs of the controls with stems that can be plugged into holes in the shield, so they can be removed before the shield is folded.

After this device has been positioned in front of a television receiver broadcasting a program intended specifically for use with the device, a viewer seats himself in front of the receiver with his head between the sides of the shield and listens for the commands or instructions that will be broadcast. These will tell him what instruments or controls to operate and when to do so. If he carefully follows such orders, he will find that the changing picture he sees on the screen is just what he would see if he were in a vehicle, such as a spacecraft, operated according to the same orders. For example, if he is told to bank the spacecraft and turn to the left, the picture he will see on the screen as he manipulates the banking and turning controls will show the landscape or other visible objects as they would appear to a pilot banking and turning his spacecraft to the left. In other words, the viewer gets a very real feeling that he is actually guiding his spacecraft. All kinds of adventures can be worked into the program, along with whatever advertising or helpful messages are desired. The viewer's close attention will be held throughout the program because he will be participating in what is taking place in the televised program.

Figure 5:
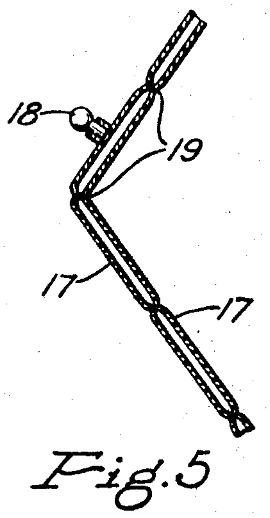
FIG. 5 is a fragmentary cross section through a wall of a modified embodiment of the invention.

Instead of making the shield of stiff material, part or all of it can be formed from flexible opaque plastic that can be folded or rolled up into a small space for mailing. With such material, two layers 17 are used so that the walls of the shield are hollow and can be inflated to stiffen and shape them as shown in FIG. 5. At a convenient point the shield is provided with an opening to permit the walls to be blown up. The opening normally is closed by a stopper 18. To prevent the walls from ballooning, their two layers will be fused or stuck together at many points 19.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A viewer-participation device for support by a television receiver, comprising a head shield having front and rear ends and a tubular front portion, means for detachably connecting the shield to a television receiver with the front end of the shield close to the television screen and surrounding the major area thereof and with the tubular front portion extending away from the screen, whereby the television picture can be viewed through said tubular portion, the shield also having side portions extending rearwardly from said tubular portion far enough to straddle a viewer's head to restrict his lateral vision, and manually manipulatable simulated controls carried by the shield for operation by the viewer in response to oral commands received from said receiver.

2. A device according to claim 1, in which said side portions of the shield extend rearwardly farther than the top and bottom, of said tubular portion and are tapered rearwardly from said top and bottom, and each side of the shield has substantially flat upper and lower areas inclined outwardly toward each other to stiffen the sides.

3. A device according to claim 2, including a transparent window removably mounted in said tubular portion.

4. A device according to claim 1, in which said connecting means include a strap secured to the bottom of the front part of the shield and extending laterally outward therefrom, and suction cups carried by the outer ends of the strap and adapted to be pressed against the opposite sides of the television receiver.

5. A device according to claim 1, in which said tubular portion of the shield flares rearwardly so that said side portions diverge rearwardly.

6. A device according to claim 5, in which at least some of said controls are mounted on the inner surfaces of said side portions.

7. A device according to claim 1, in which said tubular portion has a substantially flat top and bottom integrally connected to said side portions by fold lines, said side portions extend rearwardly farther than said top and bottom, and said top and bottom are each provided with a center fold line extending from front to back to permit them to be folded to cause said side portions to lie flat against each other when not in use.

8. A device according to claim 1, in which said side portions taper rearwardly from the top and bottom of said tubular portion of the shield.

9. A device according to claim 1, in which each side of the shield has flat upper and lower areas inclined outwardly toward each other.

10. A device according to claim 1, including a transparent window removably mounted in said tubular portion.

11. A device according to claim 1, in which said shield has hollow walls formed of flexible plastic, and a normally closed opening for admitting air under pressure into said walls to inflate and stiffen them.

References Cited

UNITED STATES PATENTS

| | | | |
|---|---|---|---|
| 2,935,316 | 5/1960 | Bradstreet | 272—17 |
| 3,077,038 | 2/1963 | Williams et al. | 35—9 |
| 3,310,884 | 3/1967 | Weitzman et al. | 35—12 |

FOREIGN PATENTS

| | | |
|---|---|---|
| 1,255,173 | 1/1961 | France. |

EUGENE R. CAPOZIO, Primary Examiner

W. W. NIELSEN, Assistant Examiner

U.S. Cl. X.R.

46—1; 178—7.82